(12) United States Patent
Bergen et al.

(10) Patent No.: US 10,607,391 B2
(45) Date of Patent: Mar. 31, 2020

(54) AUTOMATED VIRTUAL ARTIFACT GENERATION THROUGH NATURAL LANGUAGE PROCESSING

(71) Applicant: International Business Machines Corporation, Armonk, NY (US)

(72) Inventors: Paul Bergen, Hillsborough, NJ (US); Robert Huntington Grant, Atlanta, GA (US); Zachary Silverstein, Austin, TX (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/027,365

(22) Filed: Jul. 4, 2018

(65) Prior Publication Data

US 2020/0013211 A1   Jan. 9, 2020

(51) Int. Cl.

| G06T 19/00 | (2011.01) |
|---|---|
| G06T 15/00 | (2011.01) |
| G06F 17/27 | (2006.01) |
| G06T 19/20 | (2011.01) |

(52) U.S. Cl.
CPC ........ G06T 15/005 (2013.01); G06F 17/2705 (2013.01); G06T 19/20 (2013.01); *G06T 2215/16* (2013.01); *G06T 2219/2016* (2013.01)

(58) Field of Classification Search
None
See application file for complete search history.

(56) References Cited

U.S. PATENT DOCUMENTS

| 8,086,028 | B2 | 12/2011 | Sproat |
| 9,129,448 | B2 | 9/2015 | Bekmambetov et al. |
| 9,495,352 | B1* | 11/2016 | Smyros ............... G06F 17/2705 |
| 2010/0053152 | A1* | 3/2010 | Lewis .................... G06T 19/00 |
| | | | 345/419 |

(Continued)

OTHER PUBLICATIONS

Lim, H., Lee, et al., "Putting real-world objects into virtual world: fast automatic creation of animatable 3D models . . . ," (ISUVR), 2012 Interntl Symposium, pp. 38-41, 2012.

*Primary Examiner* — Martin Mushambo
(74) *Attorney, Agent, or Firm* — Steven M. Greenberg, Esq.; Shutts & Bowen LLP

(57) ABSTRACT

Embodiments of the present invention provide a method, system and computer program product for automated virtual artifact generation through natural language processing. In an embodiment of the invention, a method for automated virtual artifact generation includes loading electronic documentation for a real world object into memory of a computer, parsing by a processor of the computer the electronic documentation into different words and storing the different words. The method further includes natural language processing the different words to determine different physical and functional attributes of the real world object, generating a virtual artifact in the memory of the computer based upon a mapping of the physical attributes of the real world object to structural attributes of the virtual artifact and a mapping of the functional attributes of the real world object to functional attributes of the virtual artifact, and rendering the virtual artifact in the virtual reality environment.

15 Claims, 2 Drawing Sheets

(56) References Cited

U.S. PATENT DOCUMENTS

| | | | |
|---|---|---|---|
| 2010/0103075 A1* | 4/2010 | Kalaboukis | A63F 13/02 345/8 |
| 2010/0169076 A1* | 7/2010 | Sproat | G06F 17/212 704/9 |
| 2011/0216002 A1* | 9/2011 | Weising | G09G 5/08 345/158 |
| 2013/0135344 A1* | 5/2013 | Stirbu | G09G 5/00 345/629 |
| 2013/0271456 A1* | 10/2013 | Haswell | G06T 19/003 345/420 |
| 2013/0271457 A1* | 10/2013 | Haswell | G06T 19/003 345/420 |
| 2015/0130836 A1* | 5/2015 | Anderson | G06T 19/006 345/633 |
| 2015/0193986 A1* | 7/2015 | Nistel | G06T 19/20 345/426 |
| 2015/0235432 A1* | 8/2015 | Bronder | G06T 19/006 345/633 |
| 2016/0189427 A1 | 6/2016 | Wu et al. | |
| 2016/0286195 A1* | 9/2016 | Lehman | H04N 13/239 |
| 2018/0004481 A1 | 1/2018 | Fallon | |

\* cited by examiner

AUTOMATED VIRTUAL ARTIFACT GENERATION THROUGH NATURAL LANGUAGE PROCESSING

BACKGROUND OF THE INVENTION

Field of the Invention

The present invention relates to the field of virtual artifact generation and more particularly to virtual artifact generation through natural language processing.

Description of the Related Art

Virtual reality, augmented reality, and mixed reality (collectively, referred to herein as "VR") create immersive computer-generated experiences for the end user. In a VR experience, the end user interacts with computer generated or virtual artifacts. Additionally, the virtual artifacts contained in the VR experience may interact with other virtual artifacts or may interact with real world objects depending on the configuration of the VR experience and the configuration of the virtual artifact. Oftentimes, virtual artifacts are modeled after real world objects in order to mimic the functions of real world objects.

Creating virtual artifacts of complex real world objects in a VR environment can be a tedious task. In order to create a virtual artifact, a specialized skillset is required to gather information regarding the functions and physical design of the corresponding real world object. Furthermore, a significant amount of time is required to determine how to map the functions and designs of the real world object to the corresponding virtual version of the real world object. Oftentimes, much of the required information is contained in the documentation for the real world objects—namely user manuals. However, currently, there is no simple and efficient way to create virtual artifacts of real world objects.

BRIEF SUMMARY OF THE INVENTION

Embodiments of the present invention address deficiencies of the art in respect to automated virtual artifact generation and provide a novel and non-obvious method, system and computer program product for automated virtual artifact generation through Natural Language Processing. In an embodiment of the invention, a method for automated virtual artifact generation includes loading electronic documentation for a real world object into memory of a computer, parsing by a processor of the computer the electronic documentation into different words and storing the different words in the memory. The method further includes natural language processing the different words in the memory to determine different physical and functional attributes of the real world object, generating a virtual artifact in the memory of the computer based upon a mapping of the physical attributes of the real world object to structural attributes of the virtual artifact and a mapping of the functional attributes of the real world object to functional attributes of the virtual artifact, and rendering the virtual artifact in the virtual reality environment.

In one aspect of the embodiment, the natural language processing classifies the different functional attributes of the real world object based upon a library of pre-defined functions. In another aspect of the embodiment, the different physical attributes comprise one or more dimensions of the real world object. In yet another aspect of the embodiment, the method further includes dimensionally scaling the virtual artifact consistent to a scale of a virtual reality environment executing in the computer and rendering the dimensionally scaled virtual artifact in the virtual reality environment. In even yet another aspect of the embodiment, the method further includes subsequent to the rendering, comparing the functional attributes of the rendered virtual artifact to the different functional attributes of the real world object to determine an accuracy of the mapping of the functional attributes of the virtual artifact and modifying the mapping of the functional attributes to account for differences between the functional attributes of the rendered virtual artifact and the functional attributes of the real world object.

In another embodiment of the invention, a data processing system is configured for automated virtual artifact generation through natural language processing. The system includes a host computing system that has memory and at least one processor. The system also includes fixed storage coupled to the host computing system and a virtual artifact generation module. The module includes computer program instructions executing in the memory of the host computing system that upon execution are adapted to perform loading electronic documentation for a real world object into memory of a computer, parsing by a processor of the computer the electronic documentation into different words and storing the different words in the memory. The program instructions are further adapted to perform natural language processing the different words in the memory to determine different physical and functional attributes of the real world object, generating a virtual artifact in the memory of the computer based upon a mapping of the physical attributes of the real world object to structural attributes of the virtual artifact and a mapping of the functional attributes of the real world object to functional attributes of the virtual artifact, and rendering the virtual artifact in the virtual reality environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for automated virtual artifact generation through natural language processing of a documentation for a real world object. In accordance with an embodiment of the invention, the documentation, e.g. a user manual, for an object is received, loaded and parsed in into different words in memory of a computer. Using natural language processing, natural language understanding and natural language classifier (collectively, referred to herein as "NLP"), a set of functional attributes of the real world object and a set of physical attributes of the real world object are determined from the parsed words of the documentation and classified accordingly. Using the classified words of the documentation, a set of functional attributes of the real world object are determined. A virtual artifact is then created in the memory of the computer according to the set of physical and functional attributes. Finally, the virtual artifact once created is scaled dimensionally relative to the other objects in the virtual reality environment and displayed in the virtual reality environment.

Figure 1:
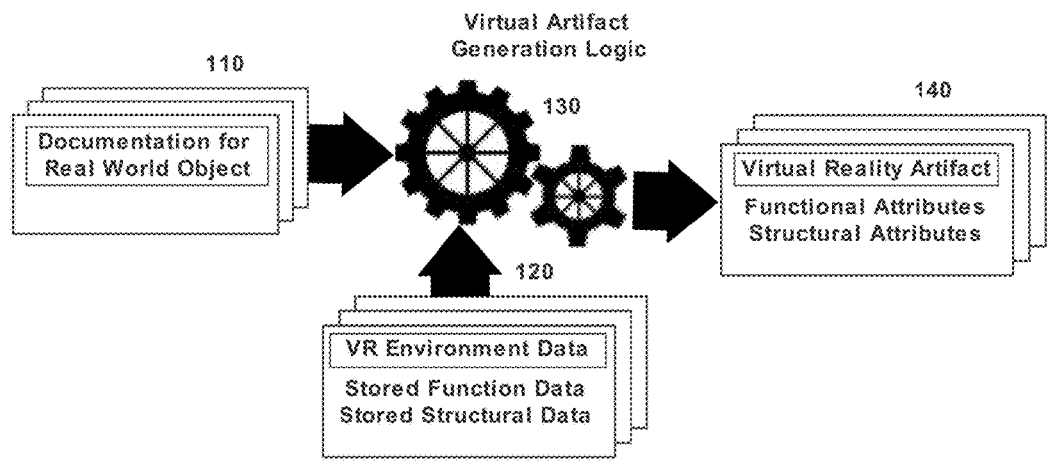
FIG. 1 is pictorial illustration of a process for automated virtual artifact generation through natural language processing.

In further illustration, FIG. 1 pictorially shows a process for automated virtual artifact generation through NLP. As shown in FIG. 1, electronic documentation, such as a user manual, for a real world object 110 is loaded and parsed by the Virtual Artifact Generation Logic 130. VR Environment Data 120 regarding other virtual artifacts and the relative size and functions of those other virtual artifacts may also be loaded into the Virtual Artifact Generation Logic. The VR Environment Data 120 may also include a library of predefined functions and attributes based on the other virtual artifacts. The NLP capabilities of the Virtual Artifact Generation Logic 130 determine a set of functional attributes and a set of physical attributes of the real world object from the documentation for the real world object, for instance an electronic form of a user manual.

Virtual Artifact Generation Logic 130 generates a virtual artifact based on the data obtained from the documentation for the real world object. Virtual Artifact Generation Logic 130 generates a mapping of the physical attributes of the real world object to structural attributes of the virtual artifact. Using this mapping, Virtual Artifact Generation Logic 130 renders the virtual artifact based on images and dimensions obtained from the user manual, which may be relative to the size of other virtual artifacts in the VR environment data 120. Virtual Artifact Generation Logic 130 classifies the functional attributes of the real world object based on the functions associated with other VR artifacts in the VR environment data and NLP keywords associated with the real world object. Virtual Artifact Generation Logic 130 then maps and binds the classified functions to the virtual artifact, so that the virtual artifact operates in the virtual environment similar to the real world object would operate in the real world.

Following the rendering of the virtual artifact and binding of the functions to the virtual artifact by the Virtual Artifact Generation Logic 130, the virtual artifact is operated by the end user. The end user then determines the accuracy of the mapping of the virtual artifact and feeds the accuracy back into the Virtual Artifact Generation Logic 130 to optimize the Virtual Artifact Generation Logic 130. Thus, Virtual Artifact Generation Logic 130 may establish and update a threshold value based on the accuracy feedback and machine learning capabilities in order to determine whether to assign a function to a virtual artifact for subsequent virtual artifact generation by Virtual Artifact Generation Logic 130. Furthermore, the Virtual Artifact Generation Logic 130 may also determine that the real world object is made up of a subset of smaller elements and may render each element separately and associate the separate functions of each element. Virtual Artifact Generation Logic 130 then may generate an assembly of the elements to display the real world object as assembled or exploded. Finally, the end user may also input additional information or documentation into Virtual Artifact Generation Logic 130 regarding the real world objects, such as additional sources, images, UPC for extracting additional information from other sources, etc.

Figure 2:
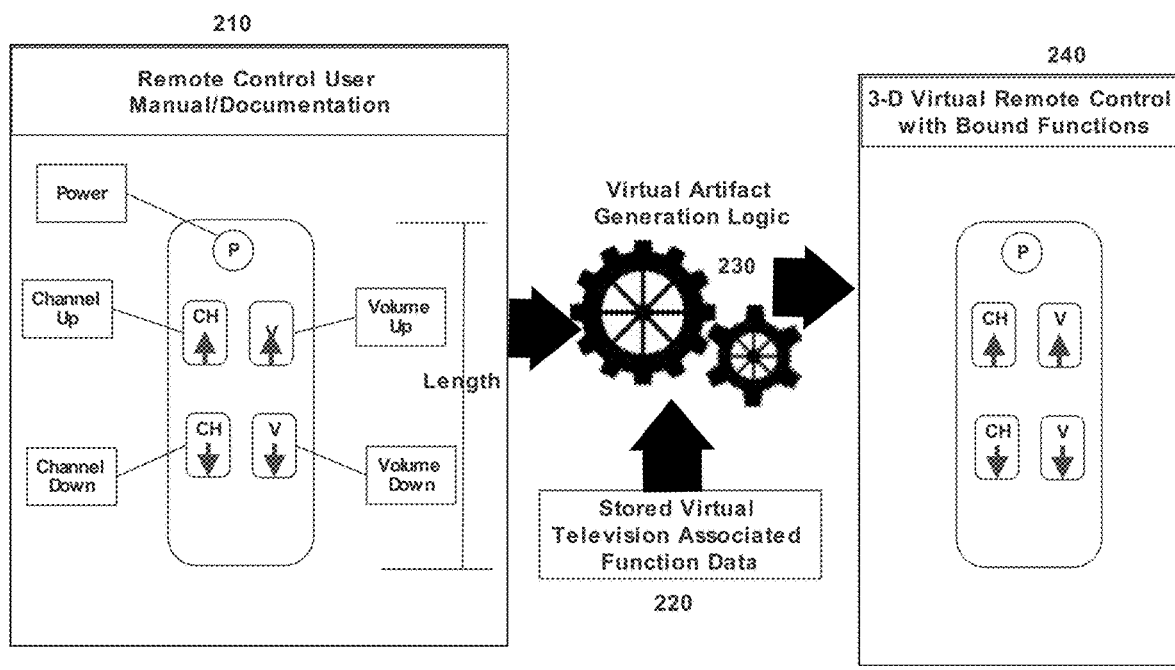
FIG. 2 is pictorial illustration of an example of a process for automated virtual artifact generation through natural language processing.

In further illustration of an example of FIG. 1, FIG. 2 pictorially shows an example of a process for automated virtual artifact generation through NLP. As shown in FIG. 2, a user manual for a remote control 210 is input into Virtual Artifact Generation Logic 230. As shown in FIG. 2, the user manual 210 includes an image of the remote control, dimensional information, and the functions associated with the remote control. The dimensional information and functional information may be specified in the image, as shown, or may be specified in subsequent documentation within the user manual or elsewhere. The dimensional or functional information may also be determined from other virtual artifacts, which may be depicted in the user manual. In this regard, stored virtual television associated function data 220 is input in the Virtual Artifact Generation Logic 230. The stored virtual television associated function data 220 may include the name of the function, the function, NLP keywords associated with the function.

For example, the function named Power On/Off would turn the connected device on or off and the associated NLP keywords may include: Power, turn on, turn off, etc. The functions named Volume Up or Volume down turn the volume up one notch or down one notch, respectively, and may include NLP Keywords, such as Volume Up, Increase Loudness, Decrease Quietness, etc. or Volume Down, Decrease Loudness, Increase Quietness, etc., respectively. The functions named Channel Up or Channel down changes the channel up or down one, respectively, and may include NLP Keywords, such as channel change up or channel change down, respectively. As these functions are associated with the virtual television and the virtual remote control will control the virtual television, Virtual Artifact Generation Logic 230 will use NLP on the user manual for the remote control to find the above-mentioned functions required to operate the virtual television by the virtual remote control.

The Virtual Artifact Generation Logic 230 parses the Remote Control User Manual 210 to determine the physical attributes and functional attributes of the real world remote control. Virtual Artifact Generation Logic 230 generates a virtual artifact remote control by mapping the physical attributes of the remote control to structural attributes of the virtual artifact remote control and mapping of the functional attributes of the remote control to functional attributes of the virtual artifact remote control. As such, Virtual Artifact Generation Logic 230 is able to generate and render a 3D virtual artifact remote control 240 based on the image and dimensions of the remote control in the user manual 210 and may scale the remote control relative to other stored virtual artifacts in the VR environment. The Virtual Artifact Generation Logic 230 may also classify the functions of the remote control, map the classified functions to the virtual buttons of the virtual remote control, and bind those functions to the virtual buttons of the virtual remote control in 240. The end user can then determine if the physical and functional attributes of the virtual remote control operate the virtual television and feed the determined accuracy back into the Virtual Artifact Generation Logic 230 to optimize the logic.

Figure 3:
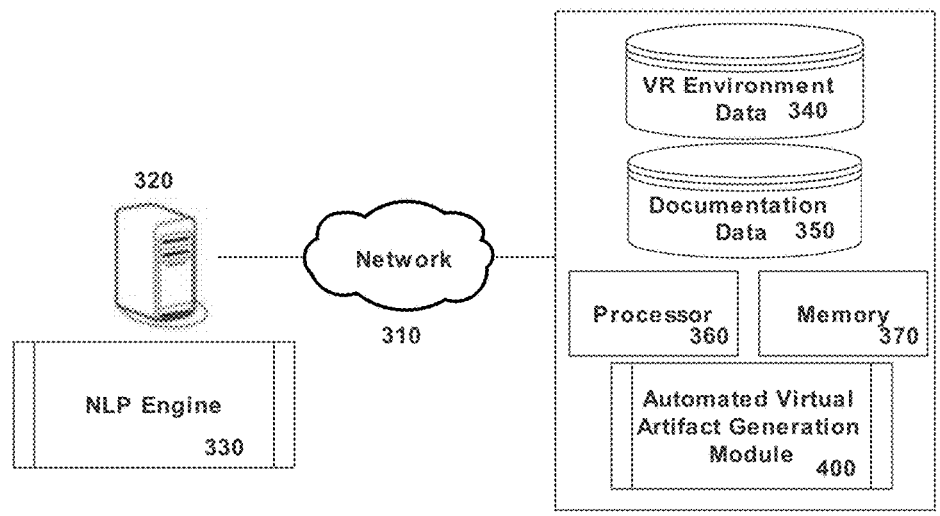
FIG. 3 is a schematic illustration of a data processing system adapted for automated virtual artifact generation through natural language processing; and, FIG. 4 is a flow chart illustrating a process for automated virtual artifact generation through natural language processing.

The processes shown in FIGS. 1 and 2 may be implemented in a computer data processing system. In further illustration, FIG. 3 schematically shows a data processing system 300 adapted for automated virtual artifact generation through NLP. The system includes a network 310 that communicates with a server 320 and an NLP engine 330 that can process the input real world object documentation data 350. The real world object documentation data 350 and the VR environment data 340 is stored in fixed storage in the system 300. The system includes a processor 360 and memory 370 to access the fixed storage 340, 350 and communicate over the network 310 with the NLP engine 330.

Automated Virtual Artifact Generation Module 400 includes program instructions which execute in memory 370 of the system 300. The program instructions are able to parse the object manual data 350, and through the NLP Engine 320, determine the functional attributes and physical attributes of the real world object. The Automated Virtual Artifact Generation Module 400 may classify the physical attributes and functional attributes from a predefined library of attributes contained in the VR environment data 340. The Automated Virtual Artifact Generation Module 400 then generates a virtual artifact based upon a mapping of the physical attributes of the real world object to structural attributes of the virtual artifact and a mapping of the functional attributes of the real world object to functional attributes of the virtual artifact. The Automated Virtual Artifact Generation Module 400 then renders the virtual artifact based on the physical attributes contained in the object documentation data 350 and may size the virtual artifact relative to other virtual artifacts contained in the VR environment data 340. Automated Virtual Artifact Generation Module 400 maps and binds the functional attributes of the real world object to the virtual artifact.

Figure 4:
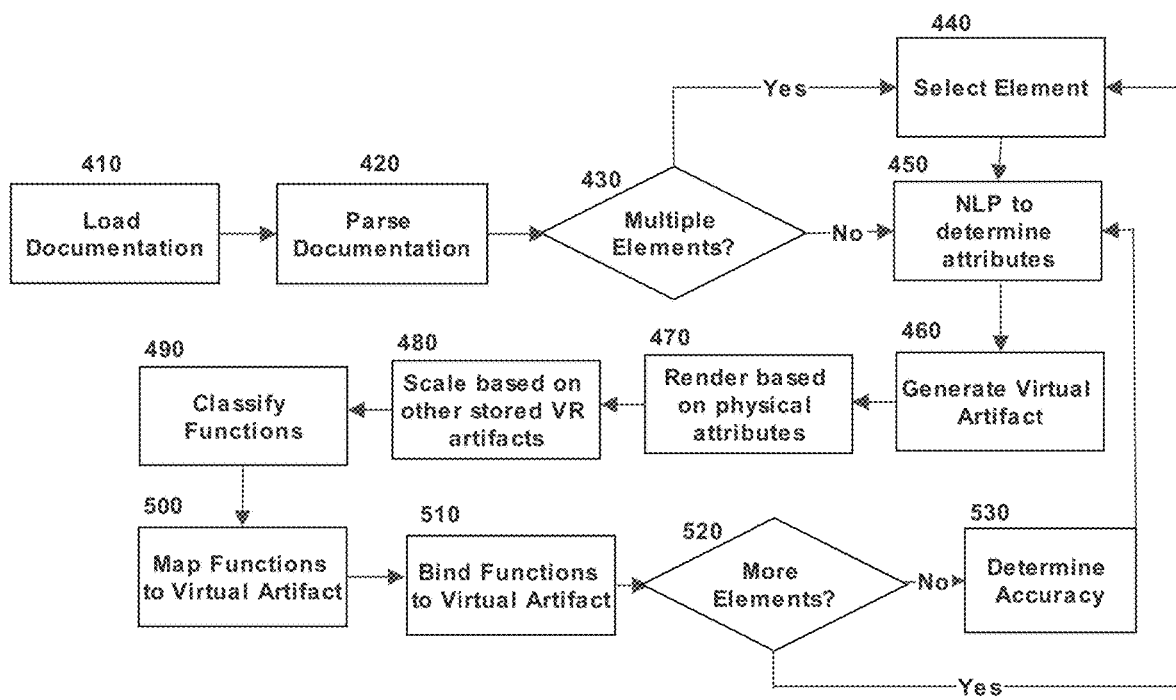

In even yet further illustration of the operation of the automated virtual artifact generation module 400, FIG. 4 is a flow chart illustrating an exemplary process for automated virtual artifact generation through NLP. Beginning in block 410, the user manual/real world object documentation is loaded and, in block 420, the documentation is parsed into different words and stored. In block 430, it is determined if the real world object is made up of multiple elements and, if so, a first element is selected in block 440. After a first element is selected of the real world object or the object is determined to not be made up of multiple elements, in block 450, NLP determines the functional and physical attributes of the real world object based on whether the functional and physical attributes exceed a threshold value of required accuracy. The virtual artifact, which is based on the functional and physical attributes of the real world object, is generated in block 460 based upon a mapping of the physical attributes of the real world object to structural attributes of the virtual artifact and a mapping of the functional attributes of the real world object to functional attributes of the virtual artifact. In block 470, the virtual artifact is rendered based upon the structural attributes mapped to images and dimensions contained in the documentation or other sources regarding the physical attributes of the real world object. The virtual artifact may then be scaled relative to the VR environment in which it is rendered in block 480.

In block 490, the functional attributes of the real world object may be classified based upon a library of pre-defined functions or attributes already contained in the virtual environment data, from the documentation, or a combination of the two. In block 500, the functional attributes of the real world object are mapped to its virtual artifact counterpart and these functional attributes are bound to the respective portions of the virtual artifact in block 510. If there are more elements, in block 520, the process is repeated for each element. Otherwise, in block 530, the end user is presented the virtual artifact and determines the accuracy of the automated process. The accuracy is then fed back into the system to optimize the system and update the threshold value of required accuracy.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method for automated virtual artifact generation through natural language processing comprising:
   loading electronic documentation for a real world object into memory of a computer;
   parsing by a processor of the computer the electronic documentation into different words and storing the different words in the memory;
   natural language processing the different words in the memory to determine different physical and functional attributes of the real world object;
   generating a virtual artifact in the memory of the computer based upon a mapping of the physical attributes of the real world object to structural attributes of the virtual artifact and a mapping of the functional attributes of the real world object to functional attributes of the virtual artifact; and,
   rendering the virtual artifact in a virtual reality environment.

2. The method of claim 1, wherein the natural language processing classifies the different functional attributes of the real world object based upon a library of pre-defined functions.

3. The method of claim 1, wherein the different physical attributes comprise one or more dimensions of the real world object.

4. The method of claim 1, further comprising:
   dimensionally scaling the virtual artifact consistent to a scale of the virtual reality environment executing in the computer and rendering the dimensionally scaled virtual artifact in the virtual reality environment.

5. The method of claim 1, further comprising:
   subsequent to the rendering, comparing the functional attributes of the rendered virtual artifact to the different functional attributes of the real world object to determine an accuracy of the mapping of the functional attributes of the virtual artifact and modifying the mapping of the functional attributes to account for differences between the functional attributes of the rendered virtual artifact and the functional attributes of the real world object.

6. A data processing system configured for automated virtual artifact generation through natural language processing, the system comprising:
   a host computing system comprising memory and at least one processor;
   fixed storage coupled to the host computing system;
   a virtual artifact generation module comprising computer program instructions executing in the memory of the host computing system that upon execution are adapted to perform:
   loading electronic documentation for a real world object;
   parsing the electronic documentation into different words and storing the different words;
   natural language processing the different words to determine different physical and functional attributes of the real world object;

generating a virtual artifact based upon a mapping of the physical attributes of the real world object to structural attributes of the virtual artifact and a mapping of the functional attributes of the real world object to functional attributes of the virtual artifact; and, rendering the virtual artifact in a virtual reality environment.

7. The system of claim 6, wherein the natural language processing classifies the different functional attributes of the real world object based upon a library of pre-defined functions.

8. The system of claim 6, wherein the different physical attributes comprise one or more dimensions of the real world object.

9. The system of claim 6, wherein the program instructions further comprise:

dimensionally scaling the virtual artifact consistent to a scale of the virtual reality environment executing in the computer and rendering the dimensionally scaled virtual artifact in the virtual reality environment.

10. The system of claim 6, wherein the program instructions further comprise:

subsequent to the rendering, comparing the functional attributes of the rendered virtual artifact to the different functional attributes of the real world object to determine an accuracy of the mapping of the functional attributes of the virtual artifact and modifying the mapping of the functional attributes to account for differences between the functional attributes of the rendered virtual artifact and the functional attributes of the real world object.

11. A computer program product for automated virtual artifact generation through Natural Language Processing, the computer program product comprising a computer readable storage medium having program instructions embodied therewith, wherein the computer readable storage medium is not a transitory signal per se, the program instructions executable by a device to cause the device to perform a method comprising:

loading electronic documentation for a real world object into memory of a computer;

parsing by a processor of the computer the electronic documentation into different words and storing the different words in the memory;

natural language processing the different words in the memory to determine different physical and functional attributes of the real world object;

generating a virtual artifact in the memory of the computer based upon a mapping of the physical attributes of the real world object to structural attributes of the virtual artifact and a mapping of the functional attributes of the real world object to functional attributes of the virtual artifact; and, rendering the virtual artifact in a virtual reality environment.

12. The computer program product of claim 11, wherein the natural language processing classifies the different functional attributes of the real world object based upon a library of pre-defined functions.

13. The computer program product of claim 11, wherein the different physical attributes comprise one or more dimensions of the real world object.

14. The computer program product of claim 11, wherein the method further comprises:

dimensionally scaling the virtual artifact consistent to a scale of the virtual reality environment executing in the computer and rendering the dimensionally scaled virtual artifact in the virtual reality environment.

15. The computer program product of claim 11, wherein the method further comprises:

subsequent to the rendering, comparing the functional attributes of the rendered virtual artifact to the different functional attributes of the real world object to determine an accuracy of the mapping of the functional attributes of the virtual artifact and modifying the mapping of the functional attributes to account for differences between the functional attributes of the rendered virtual artifact and the functional attributes of the real world object.

* * * * *